US00RE47269E

(19) United States
(12) Reissued Patent
Lee

(10) Patent Number: US RE47,269 E
(45) Date of Reissued Patent: Mar. 5, 2019

(54) ACTIVATING MECHANISM FOR CONTROLLING THE OPERATION OF A DOWNHOLE TOOL

(71) Applicant: Schoeller-Bleckmann Oilfield Equipment AG, Ternitz (AT)

(72) Inventor: Paul Bernard Lee, Calgary (CA)

(73) Assignee: Schoeller-Bleckmann Oilfield Equipment AG (AT)

(21) Appl. No.: 14/745,324

(22) Filed: Jun. 19, 2015

Related U.S. Patent Documents

Reissue of:
(64) Patent No.: 7,866,397
Issued: Jan. 11, 2011
Appl. No.: 11/917,621
PCT Filed: Jun. 9, 2006
PCT No.: PCT/IB2006/001536
§ 371 (c)(1),
(2) Date: Jun. 30, 2008
PCT Pub. No.: WO2006/134446
PCT Pub. Date: Dec. 21, 2006

(30) Foreign Application Priority Data

Jun. 15, 2005 (GB) ..... 0512125.6
Jun. 20, 2005 (GB) ..... 0512391.4
Jun. 29, 2005 (GB) ..... 0513140.4

(51) Int. Cl.
*E21B 34/14* (2006.01)
*E21B 21/10* (2006.01)
(Continued)

(52) U.S. Cl.
CPC ..... *E21B 34/14* (2013.01); *E21B 10/322* (2013.01); *E21B 21/103* (2013.01); *E21B 23/04* (2013.01); *E21B 2034/007* (2013.01)

(58) Field of Classification Search
CPC ..... E21B 34/14; E21B 23/04; E21B 21/103; E21B 10/322; E21B 2034/007
See application file for complete search history.

(56) References Cited

U.S. PATENT DOCUMENTS 2,633,916 A 4/1953 Baker et al.
2,638,988 A * 5/1953 Williams ..... 166/99
(Continued)

FOREIGN PATENT DOCUMENTS

CA 904741 A 7/1972
CA 2 316 796 A1 10/1998
(Continued)

OTHER PUBLICATIONS

"Defendant's Preliminary Invalidity Contentions and Accompanying Production," *Schoeller-Bleckmann Oilfield Equipment AG et al. v. Churchill Drilling Tools (Rentals) Ltd. et al.;* Civil Action No. 3:13-cv-00100, filed Dec. 27, 2013, 23 pages and Exhibit A (216 pages).
(Continued)

*Primary Examiner* — Catherine S Williams
(74) *Attorney, Agent, or Firm* — Lewis Roca Rothgerber Christie LLP

(57) ABSTRACT

An activating mechanism for controlling the operation of a downhole tool in a drill string and which is intended to be housed in a portion of the drill string upstream of the downhole tool, in which: the activating mechanism has a first mode in which it allows through-flow of drilling fluid to the downhole tool and a second mode in which through-flow of fluid is blocked; and the activating mechanism has a number of through-flow ports permitting through-flow of drilling fluid in said first mode of the mechanism and which are capable of being blocked by launching a number of flow blocking activator balls down the drill string and which each are of such size and shape that they can block access to said
(Continued)

through-flow ports in order to activate the mechanism to the second mode and thereby adjust the downhole tool from one mode of operation to another.

30 Claims, 9 Drawing Sheets

(51) Int. Cl.

| | |
|---|---|
| ***E21B 10/32*** | (2006.01) |
| ***E21B 23/04*** | (2006.01) |
| *E21B 34/00* | (2006.01) |

(56) References Cited

U.S. PATENT DOCUMENTS

| | | | | |
|---|---|---|---|---|
| 2,647,727 | A * | 8/1953 | Edwards | 166/318 |
| 2,998,075 | A | 8/1961 | Clark, Jr. | |
| 3,799,278 | A | 3/1974 | Oliver | |
| 4,310,050 | A * | 1/1982 | Bourgoyne, Jr. | E21B 21/00 137/501 |
| 4,645,006 | A | 2/1987 | Tinsley | |
| 4,889,199 | A | 12/1989 | Lee | |
| 5,484,107 | A * | 1/1996 | Holmes | 239/427.5 |
| 5,499,687 | A | 3/1996 | Lee | |
| 5,960,881 | A | 10/1999 | Allamon et al. | |
| 6,041,874 | A | 3/2000 | Lee | |
| 6,253,861 | B1 | 7/2001 | Carmichael | |
| 6,378,612 | B1 | 4/2002 | Churchill | |
| 6,467,546 | B2 | 10/2002 | Allamon et al. | |
| 6,491,103 | B2 | 12/2002 | Allamon et al. | |
| 6,520,257 | B2 | 2/2003 | Allamon et al. | |
| 6,732,793 | B1 | 5/2004 | Lee | |
| 6,820,697 | B1 | 11/2004 | Churchill | |
| 6,923,255 | B2 * | 8/2005 | Lee | 166/154 |
| 7,055,605 | B2 | 6/2006 | Howlett et al. | |
| 7,347,288 | B2 | 3/2008 | Lee | |
| 7,347,289 | B2 | 3/2008 | Lee | |
| 7,387,165 | B2 | 6/2008 | Lopez de Cardenas et al. | |
| 7,416,026 | B2 | 8/2008 | Naquin et al. | |
| 7,416,029 | B2 | 8/2008 | Telfer et al. | |
| 7,640,991 | B2 * | 1/2010 | Leising | 166/373 |
| 7,673,708 | B2 | 3/2010 | Lee | |
| 7,891,441 | B2 | 2/2011 | Lee | |
| 2003/0062161 | A1 | 4/2003 | Mondelli et al. | |
| 2004/0011566 | A1 | 1/2004 | Lee | |
| 2004/0099447 | A1 * | 5/2004 | Howlett et al. | 175/317 |
| 2005/0072572 | A1 | 4/2005 | Churchill | |
| 2006/0102348 | A1 | 5/2006 | Churchill | |
| 2006/0124310 | A1 | 6/2006 | Lopez De Cardenas et al. | |
| 2007/0181313 | A1 | 8/2007 | Churchill | |

FOREIGN PATENT DOCUMENTS

| | | | | |
|---|---|---|---|---|
| GB | 2 268 770 | A | 1/1994 | |
| WO | 92 13168 | | 8/1992 | |
| WO | WO 2001/09529 | A1 | 2/2001 | |
| WO | WO 2001/90529 | A1 | 11/2001 | |
| WO | WO 0214650 | A1 * | 2/2002 | E21B 21/103 |
| WO | WO 2002/061236 | A1 | 8/2002 | |
| WO | 02 068793 | A1 | 9/2002 | |
| WO | 2004 022906 | A1 | 3/2004 | |
| WO | 2004 022913 | A1 | 3/2004 | |
| WO | WO 2004/022907 | A1 | 3/2004 | |
| WO | WO 2004/088091 | A1 | 10/2004 | |
| WO | WO 2004/106694 | A1 | 12/2004 | |
| WO | 2005 094166 | A2 | 10/2005 | |

OTHER PUBLICATIONS

"Defendant's First Amended Preliminary Invalidity Contentions," *Schoeller-Bleckmann Oilfield Equipment AG et al.* v. *Churchill Drilling Tools* (*Rentals*) *Ltd. et al.;* Civil Action No. 3:13-cv-00100, filed Feb. 27, 2014, 23 pages and Exhibit A (220 pages).

Inter Partes Review for Case No, IPR2014-00814 filed May 23, 2014, Pleadings 1, 7-8, 17, 20-24, 26-27 and 31-35, Exhibits 1002-1038, 1048-1062, 2001-2016 and 2019, part 1: 172 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 2: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 3: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 4: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 5: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 6: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 7: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 8: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 9: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 10: 151 pages.

Inter Partes Review for Case No, IPR2014-00814 filed May 23, 2014, Pleadings 1, 7-8, 17, 20-24, 26-27 and 31-35, Exhibits 1002-1038, 1048-1062, 2001-2016 and 2019, part 11: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 12: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 13: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 14: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 15: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 16: 151 pages.

Inter Partes Review for Case No. IPR2014-00814 filed May 23, 2014, Pleadings 1, 7-8, 17, 20-24, 26-27 and 31-35, Exhibits 1002-1038, 1048-1062, 2001-2016 and 2019, part 17: 151 pages.

Eric W. Weisstein, Spherical Ring, http://mathworld.wolfram.com/SpericalRing.html, Apr. 4, 2005, 2 pages.

* cited by examiner

ACTIVATING MECHANISM FOR CONTROLLING THE OPERATION OF A DOWNHOLE TOOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue of U.S. Pat. No. 7,866,397 issued on Jan. 11, 2011, application Ser. No. 11/917,621 filed on Jun. 30, 2008 which is a National Phase Patent Application and claims priority to and benefit of International Application Number PCT/IB2006/001536, filed on Jun. 9, 2006, which claims priority to and benefit of GB Application Number 0512125.6, filed on Jun. 15, 2005; GB Application No. 0512391.4, filed Jun. 20, 2005; and GB Application No. 0513140.4, the entire disclosures of which are incorporated herein by reference.*

This invention relates to a novel activating mechanism for controlling the operation of a downhole tool.

The use of a ball-activated mechanism to actuate a downhole tool is well known in the exploitation of gaseous and liquid hydrocarbon reserves, and examples include U.S. Pat. Nos. 5,499,687 and 4,889,199, to which reference is made for a fuller disclosure of this technology.

In this known technology, a large deformable (activating) ball is launched down the drill string to come into engagement with a ball seat of an axially shiftable sleeve, and which then blocks flow of drilling fluid downwardly through the sleeve (in its through-flow mode) with consequent increase in pressure upstream of the ball seat. This increase in pressure acts on the ball which then acts downwardly on the sleeve to move it to a by-pass mode in which fluid flow is diverted laterally through one or more by-pass ports in a surrounding main hollow body in which the sleeve is mounted.

To deactivate the mechanism, a small hard ball is launched down the drill string, and which blocks access to the by-pass port and which results in a further increase in pressure above the ball seat and which eventually becomes sufficient to deform the large deformable ball as it is forced downwardly through the ball seat. This then allows the sleeve to return under spring or other biassing back to its normal through-flow mode.

In one aspect the present invention has been developed with a view to provide a novel activating mechanism (which controls the operation of the downhole tool) which can be activated by launching down the drill string at least one non-deformable activator ball.

In a further aspect the invention provides a novel mechanism utilising a cluster of non-deformable activator balls.

According to the invention there is provided a method of controlling the operation of a downhole tool in a drill string via an activating mechanism which is housed in a portion of the drill string upstream of the downhole tool, in which:

(a) the activating mechanism has a first mode in which it allows through-flow of drilling fluid to the downhole tool and a second mode in which a through-flow of fluid is blocked; and (b) the activating mechanism has a number of through-flow ports permitting through-flow of drilling fluid in said first mode of the mechanism and which are capable of being blocked in order to activate the mechanism to the second mode:

in which a number of flow blocking activator balls are launched down the drill string and which each are of such a size and shape that they can block access to said, through-flow ports in order to activate the mechanism to the second mode and thereby adjust the downhole tool from one mode of operation to another.

A method according to the invention therefore enables the operation of a downhole tool readily to be controlled, by launching a number or "cluster" of small hard activator balls from the surface and down the drill string in order that the mouth of each port can receive a respective ball which thereby blocks flow though the port.

In a first preferred example according to the invention, the activating mechanism is operative to adjust the downhole tool e.g. an under-reamer tool between an operative condition and an inoperative condition. In the case of an under-reamer tool, the inoperative condition obtains when the reamer blades are in a withdrawn position relative to the body of the tool, and in the operative condition the reamer blades are in a radially projected position relative to the axis of the drill string so as to be engageable with the surrounding formation.

Preferably, the activating mechanism takes the form of a ball-activated tool, which comprises:

a hollow main body adapted for mounting in a drill string and through which fluid can flow when the tool is an a de-activated mode;

a tubular collet slidably mounted in the main body for movement between a retained inactive position and a released position corresponding respectively to the de-activated mode of the tool and an activated mode;

a ball-receiving seat coupled with the collet and arranged to receive an activating ball launched from the surface and down the drill string to activate the tool;

spring means arranged in the main body to maintain the collet in the retained position;

a retainer arranged in the main body to engage with and to retain the tubular collet in the inactive position, and to release the collet when the tool is activated;

an activating sleeve coupled with the collet for movement therewith to an activating position of engagement with a stop on the main body;

a first by-pass port provided in the collet and communicable internally with the interior of the collet and externally with the space defined between the outer surface of the collet and the inner surface of the main body when the tool is activated; and a second by-pass port provided in the activating sleeve and communicable externally with the space defined between the outer surface of the sleeve and the inner surface of the main body, and internally with the interior of the sleeve, when the sleeve reaches its activating position;

whereby, upon engagement of an activating ball with the seat to activate the tool, the following sequence takes place:

a. fluid pressure builds-up upstream of the seat;

b. subsequent release of the collet by the retainer;

c. movement of the collet, the ball and the seat, and the activating sleeve until the sleeve reaches its activating position; and d. by-pass flow of fluid around the ball and valve seat via the first and second by-pass ports so that pressurised fluid can flow via the main body to activate the related hydraulically operated device.

Conveniently, the activating sleeve is engageable with an internal shoulder provided on the main body to form said stop.

The collet may be coupled with the activating sleeve for movement therewith via said valve seat.

Conveniently, the ball-activating tool is coupled with a related hydraulically operated device, and preferably an under reamer. The main body may therefore include a top sub in which the tool is incorporated, and a bottom sub in which the under reamer device is mounted.

The under reamer includes one or more cutter movably mounted in the bottom sub for movement between a withdrawn inoperative position, and an outwardly projecting operative position.

A flat spring arrangement may be provided to engage via its outer side with said cutter, and on its inner side is exposed to fluid flow through the main body when the tool is activated, such that the spring arrangement can operate to press the cutter outwardly to the operative position.

Conveniently, the retainer and the spring means comprise an assembly of a retainer ring, a set of spacers and spring washers.

The retainer ring is therefore preferably a rigid retaining ring, which pre-loads the spring washers and also retains the collet. The retainer ring holds the collet in place, and fluid dynamics will not affect it.

The ball-activated tool may be activated by launching a single large (non-deformable) ball down the drill string to engage a dedicated seat for the large ball. Alternatively, the tool may be activated by launching a cluster of small hard (non-deformable) balls down the drill string to engage a seat which is provided with a number of ports each dedicated to be engaged by a respective one of the small balls.

The first preferred example therefore involves use of a ball-activated tool which is caused to "pressure-up" the drill string upstream of the seat (which is activated by launch of the large ball, or the cluster of small balls), so that by-pass flow of fluid is conveyed to the downhole tool via the activating mechanism and at an increased pressure sufficient to adjust the downhole tool from its inoperative condition to its operative condition.

In a second preferred example according to the invention, a ball-activated by-pass tool forms the activating mechanism and which is operative in a first operating mode to allow through-flow passage of fluid to lubricate and cool a drilling bit arranged downstream of the by-pass tool, and in a second operating mode to allow by-pass flow of fluid into the surrounding formation, and said tool comprising:

a tubular casing defining a through-flow passage to allow fluid to flow lengthwise of the tool between inlet and outlet ends of the casing and each being communicable with the drill string;

a transverse by-pass port in the wall of the casing;

a control sleeve mounted in the casing for axial movement between first and second end positions corresponding to the first and second operating modes of the tool;

means biassing the control sleeve towards the first end position so as to block communication with the by-pass port and allow through-flow passage of fluid in the first operating mode;

a ball-receiving seat provided in the tool to receive a first deformable activating ball to be launched down the drill-string when it is required to adjust the tool from its first operating mode to its second operating mode, said seat being operative when it receives the activating ball to move the sleeve from its first end position to its second end position against the action of the biassing means, and in which the first activating ball is deformable by the action of a second de-activating ball launched down the drill string so that the first ball can move lengthwise of the tool and thereby allow the sleeve to move back to its first end position under the action of the biassing means when it is required to adjust the tool from its second operating mode to its first operating mode; and at least one by-pass seat port provided in the ball-receiving seat and which is operative to permit limited flow of fluid through the sleeve when the latter is in its second end position.

The by-pass seat port therefore allows continued, but limited flow of fluid through the sleeve when the latter has been adjusted to its second end position corresponding to the second operating mode of the tool (by-pass flow of fluid). This enables drilling fluid, usually drilling mud, to continue to flow to the drilling bit, (despite the fact that the tool has been activated to the by-pass mode), and therefore there is continued lubrication and cooling of the drill bit so as to prevent, or at least minimise, the risk of permanent damage by over heating of the drilling bit in high temperature applications.

Conveniently, the control sleeve has a side port which is communicable with the by-pass port in the wall of the casing when the tool is in its second operating mode. Then, upon launching of the second deactivating ball, it comes to rest in a position blocking access to the side port, and thereby interrupts further by-pass flow of fluid. The pressure therefore increases in the sleeve upstream of the ball-receiving seat, and when a predetermined threshold pressure is exceeded, the first deactivating ball is deformed so as to pass downwardly through the seat. It may be arranged also that this action is assisted by downward pressure of the second deactivating ball on the first activating ball. The sleeve is thus free to return under the action of its biassing means to the first end position so that the tool takes up again its first operating mode.

Preferably, a third type of ball(s) is provided, to be used (in addition to the second deactivating ball) when it is required to revert the tool back to its first operating mode from its second operating mode. Thus, in the second operating mode, the first deformable activating ball is engaged with the ball-receiving seat and main by-pass of fluid is conveyed into the surrounding formation via the by-pass port in the wall of the casing, whereas limited flow of fluid continues to be conveyed to the drill bit via the by-pass seat port.

The third type of ball is launched from the surface and down the drill string, and it is of a size such that it can block flow of fluid through the by-pass seat port. This enables the pressure upstream of the ball-receiving seat to increase still further (in addition to the pressurisation caused by launching of the second deactivating ball), and ensures deformation of the first ball and subsequent movement of the control sleeve back to its first operating position.

Conveniently, a set of circumferentially spaced seat ports is provided, and therefore a corresponding cluster of the third type of balls may be provided to be launched from the surface and to close most, if not all access to the seat ports.

Upon deformation of the first activating ball and its movement through the seat, this is then followed by the second deactivating ball and the one or more third type of balls.

Conveniently, a ball catcher device may be arranged down stream of the ball-receiving seat, to catch at least the first (larger) deformable ball and preferably also the second deactivating ball, which is preferably a hard steel ball. The third type of ball will usually be smaller than the first and second balls, since the seat ports which they have to close off will usually be small in diameter, to permit required amount of limited continued flow of fluid through the sleeve, and therefore it will be acceptable for these smaller third type of balls to be discharged through the drilling bit and into the surrounding formation which is being drilled. Alternatively, the small type of third balls may return with the return flow of the drilling mud.

In a third preferred example according to the invention, the activating mechanism (preferably ball-activated) to actuate a downhole tool comprises:

a hollow main body adapted for mounting in a drill string and through which flow of fluid to the tool can be routed;

an actuating sleeve defining a through-flow passage and slidably mounted in the main body for movement between positions corresponding to a through-flow mode and a by-pass mode of the mechanism;

biassing means acting on the sleeve to urge it to its position corresponding to the through-flow mode of the mechanism;

a seat providing access to said passage in the through-flow mode of the mechanism; and a deformable activator capable of being launched down the drill string to engage the seat and thereby cause pressure upstream of the seat to increase so that the activator moves the sleeve to its position corresponding to the by-pass mode of the mechanism;

in which the activator and the seat are arranged to co-operate with each other, when the activator engages the seat, in such a way that restricted flow of fluid through the sleeve is maintained when the mechanism is in its by-pass mode.

Therefore, in the by-pass mode of the mechanism, continued though restricted flow of fluid can be maintained to the drilling tool to prevent it from overheating.

Preferably, the hollow body has at least one by-pass port to direct fluid flow laterally of the sleeve and the body, when the mechanism is in its by-pass mode. The sleeve is moved by the deformable activator so as to allow access to the by-pass port.

However, to deactivate the mechanism, at least one hard non-deformable activator, preferably a small hard steel ball, is launched down the drill string and moves to a blocking position which blocks by-pass flow of fluid to the by-pass port, thereby causing increase in pressure upstream of the seat, but generally not to a level sufficient to move the deformable activator downwardly through the seat and through the sleeve.

To deactivate the mechanism, a set of small non-deformable activators is preferably provided, e.g. in the form of small hard balls, and which is launched down the drill string, and the arrangement of the seat and the deformable activator (defining limited through-flow passages for fluid when they inter-engage) is such that the small activators block the limited through-flow passages.

The pressure upstream of the seat thus increases further, and eventually causes downward movement (accompanied by sufficient inward deformation of the deformable activator) through the seat and the sleeve.

The sleeve then is returned (under its biassing) to its position corresponding to the through-flow mode, and the mechanism then reverts to its original mode of operation.

Any suitable downhole tool can have its operation controlled by a mechanism according to the invention, and can be actuated and de-actuated by the mechanism in any required way. By way of example only, through-flow of fluid to the tool and via the mechanism can operate a linearly displaceable mandrel and/or a laterally outwardly moving actuator, which acts on the tool to control its operation. Return movement of the mandrel or the laterally moving actuator can then revert the tool to its original mode of operation. It should be understood that one of the modes of the downhole tool may be an inactive mode.

Preferably, the deformable activator comprises a ball-dart combination, in which a ball-like portion at least is deformable and is capable of seating on the seat, and a dart-like portion can project downwardly through the seat. A ball-dart combination can readily be launched down a drill string, and with suitable weighting of the combination, the dart can pull the ball downwardly, under gravity, and with the dart eventually projecting downwardly through the seat and the "ball" engaging the seat.

To provide limited through-flow of fluid in the by-pass mode, it is preferred that the activator is hollow and is provided with an internal flow control device. This may comprise a number of separate restricted passageways, conveniently formed by separate ports in a carrier ring.

Examples of an activating mechanism according to the invention for controlling the operation of the downhole tool will now be described in detail with reference to the accompanying drawings, in which.

Figure 4:
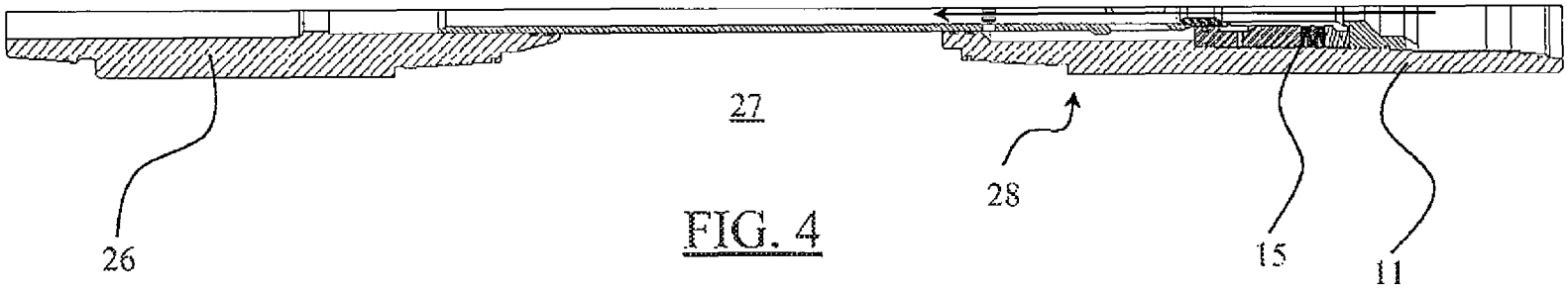
Figure 5:
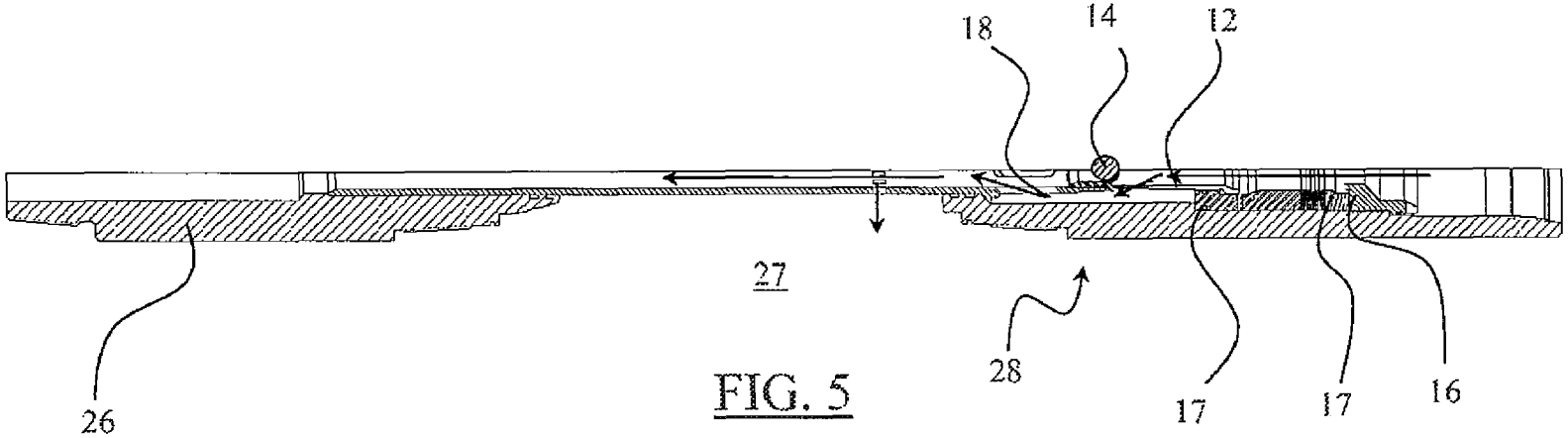
Figure 6:
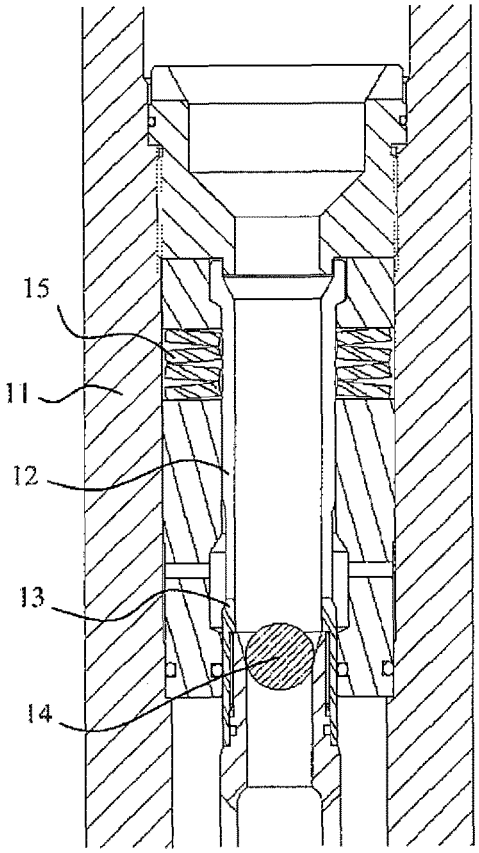
Figure 7:
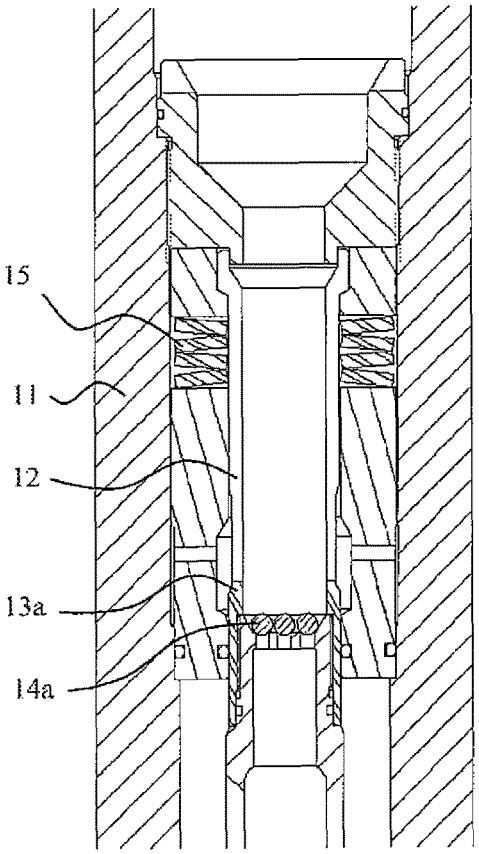
Figure 8:
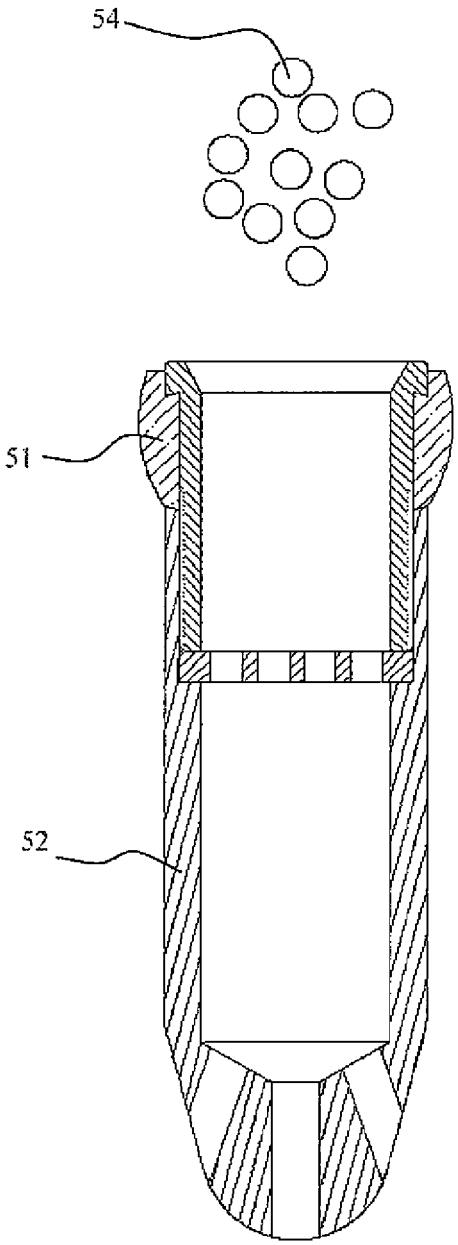
Figure 9:
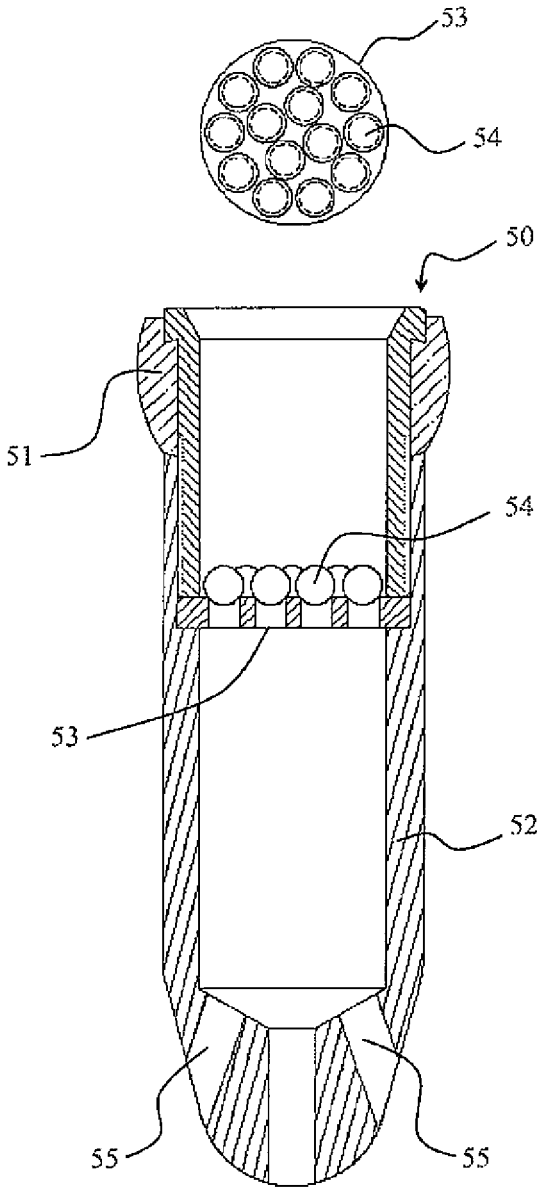
Figure 9A:
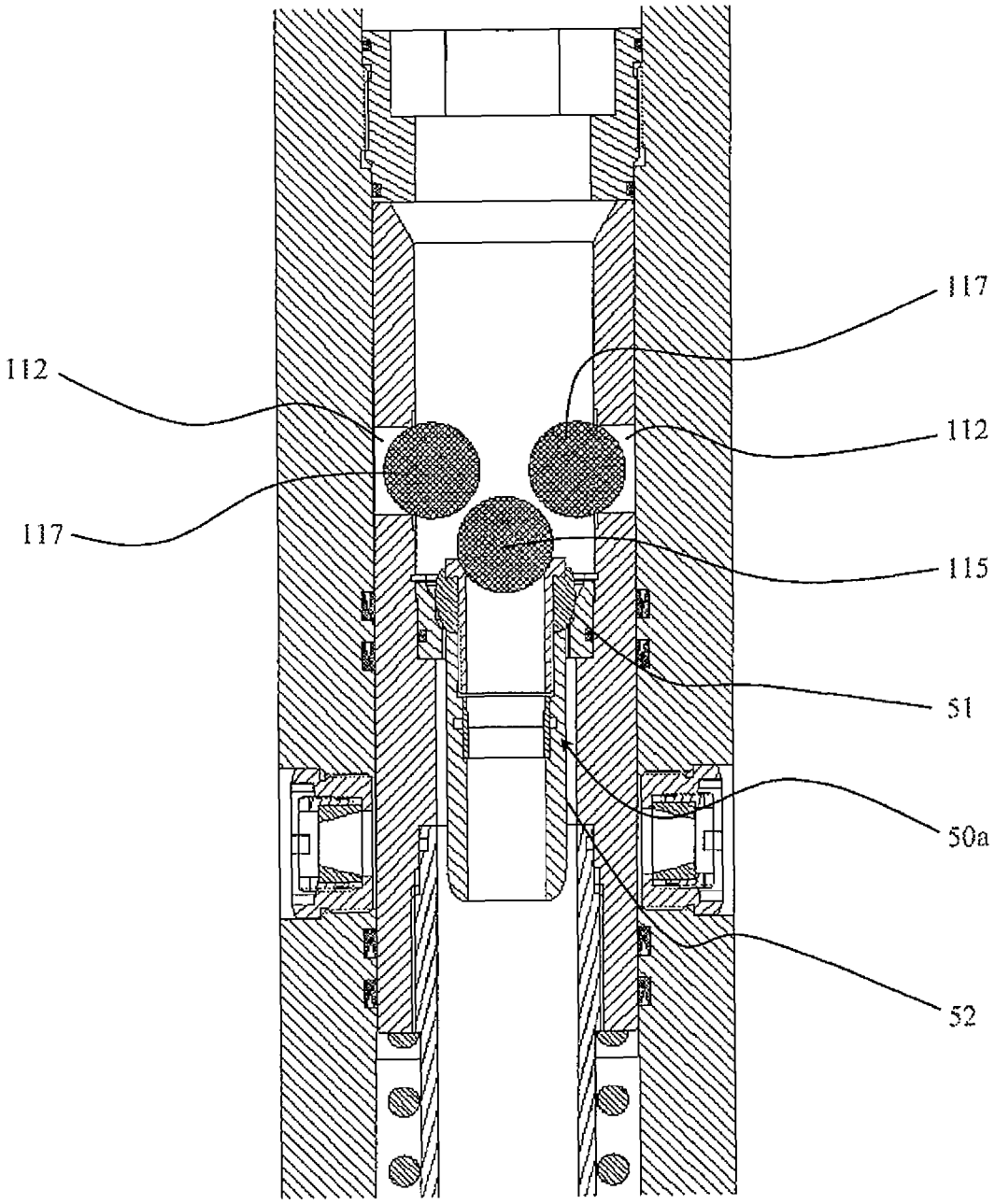
Figure 9B:
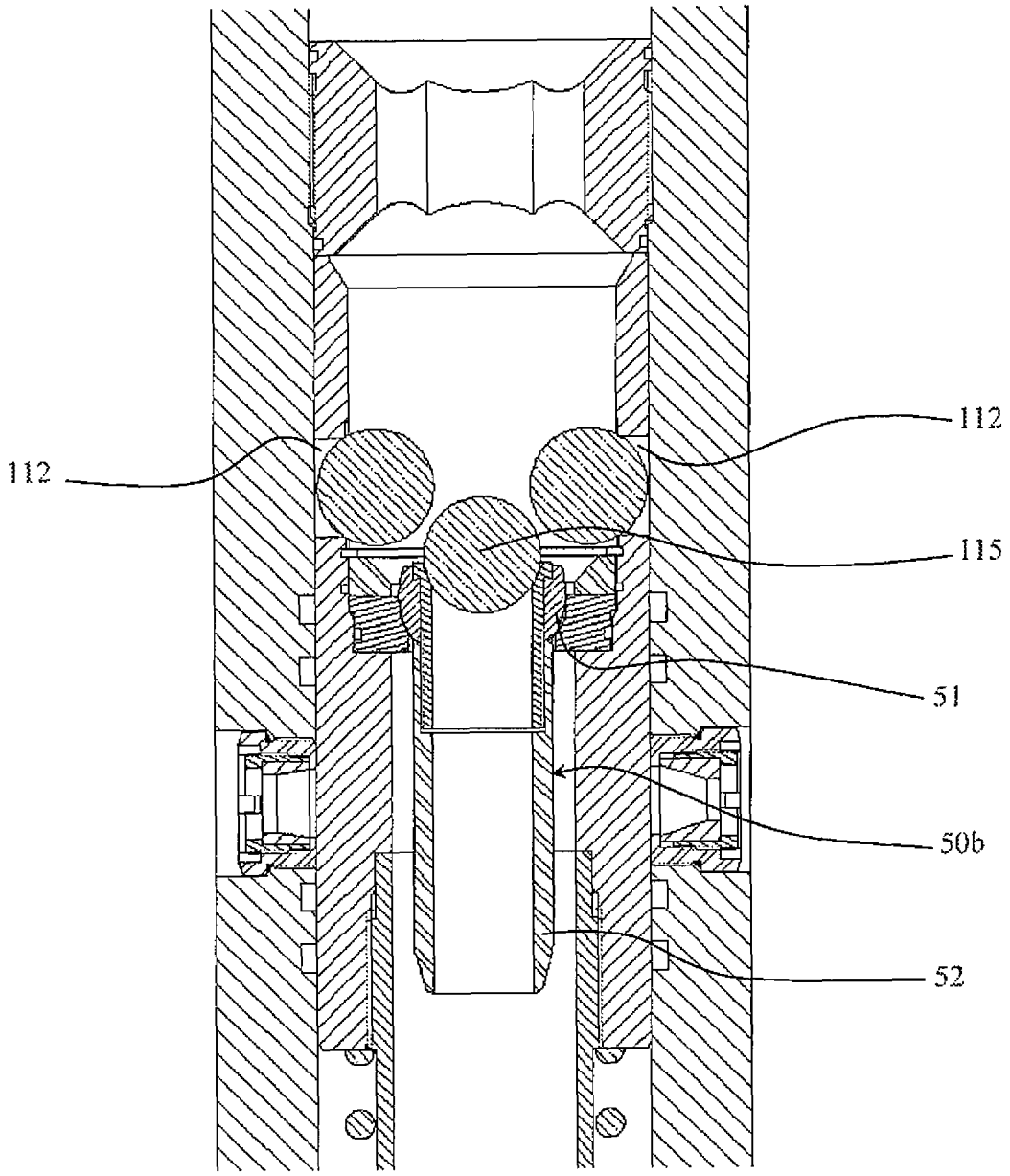
Figure 11:
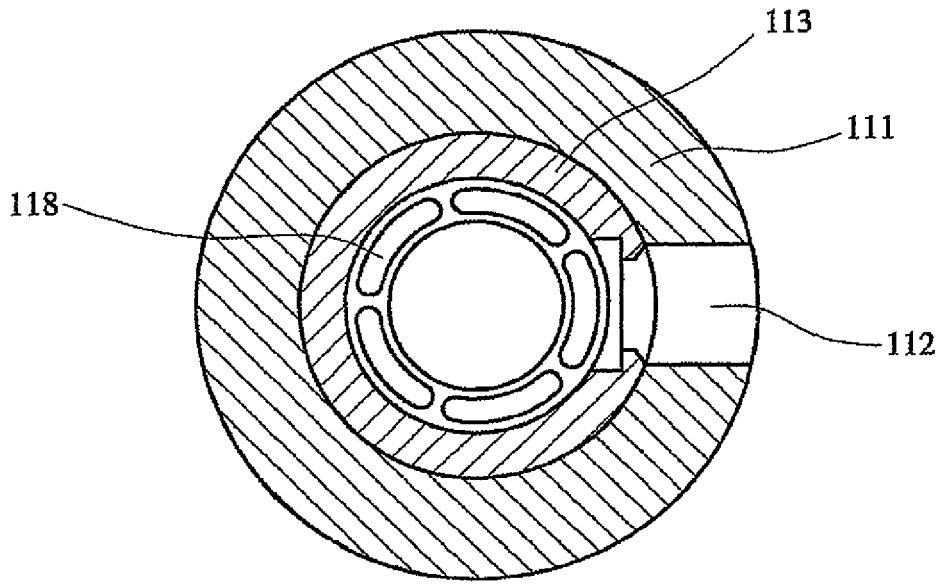
Figure 10:
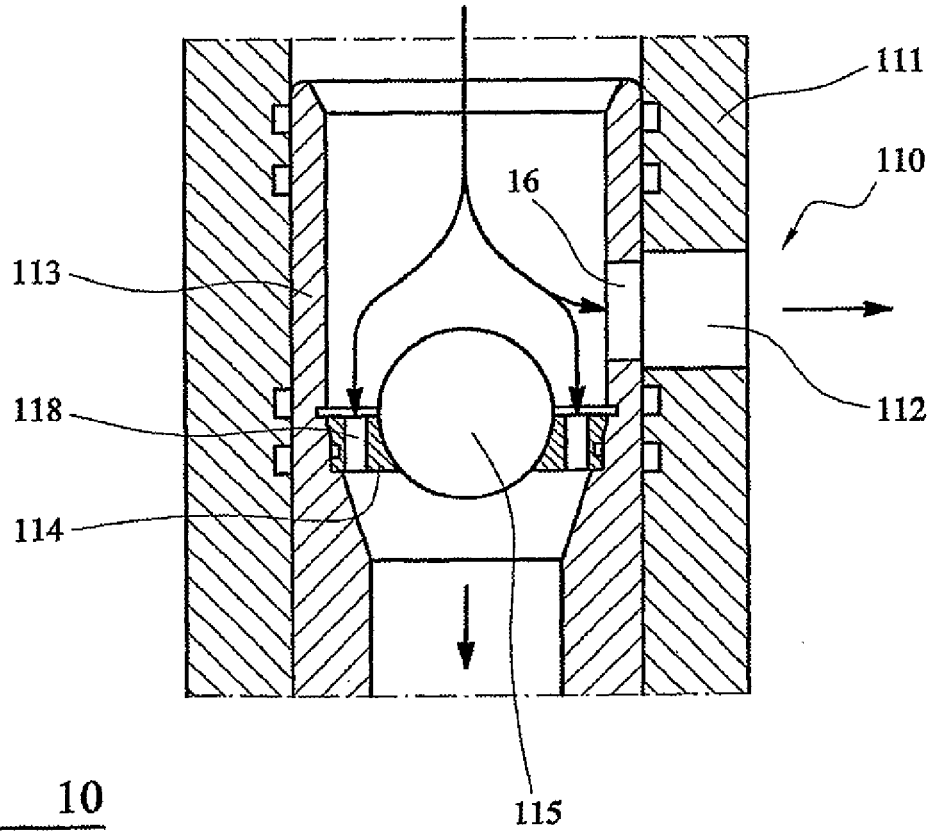
Figure 13:
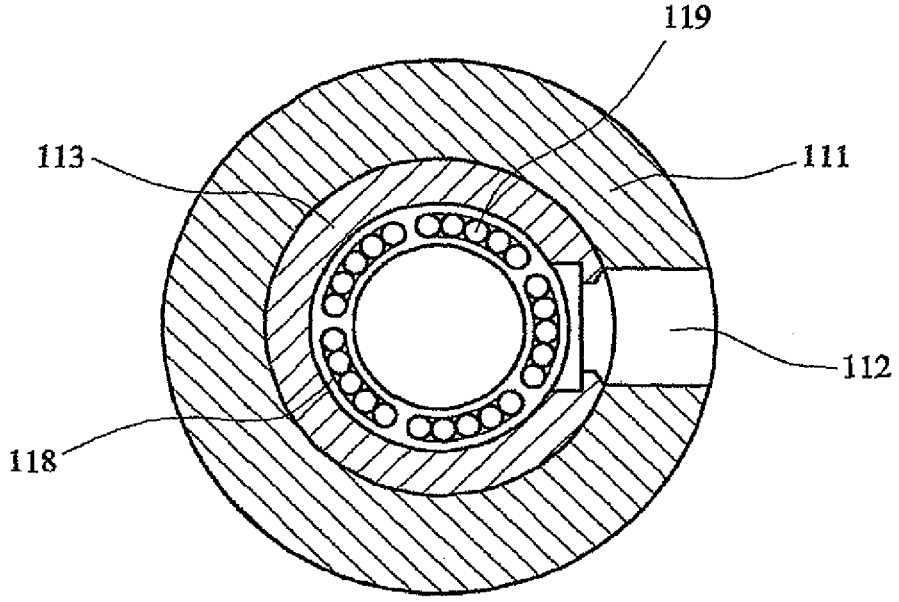
Figure 12:
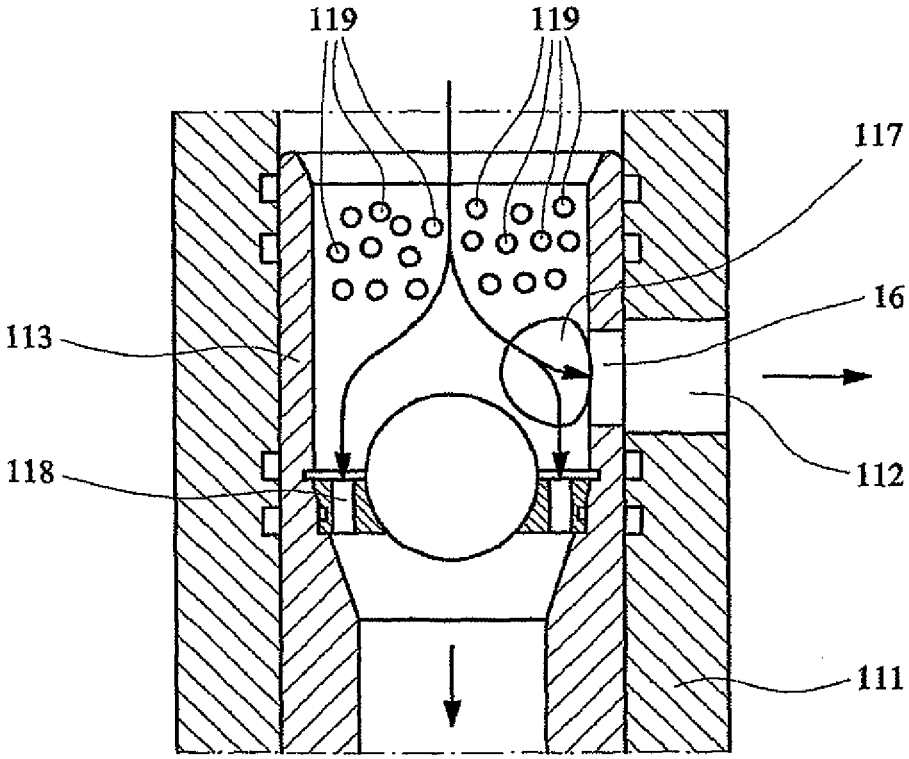

FIG. 3 shows, in the separate views, a, b, c, d thereof, fluid flow relative to the tool in, respectively, (1) the deactivated mode of the tool, (2) the launching of an activating ball to initiate activation of the tool, (3) the build-up of fluid pressure on the activating ball after it has been received by a ball seat and to pressure-up the system, and (4) adjustment of the components of the tool under the action of the pressure build-up in order to activate the hydraulically operated device;

FIG. 4 is a longitudinal sectional view of a top sub and a bottom sub of a drill string, in which the ball activated tool is mounted in the top sub, and a hydraulically activated downhole tool (e.g. an under-reamer) can be mounted in the bottom sub, and the figure showing the ball activated tool in its deactivated mode;

FIG. 5, is similar to FIG. 4, but showing the ball activated tool in its activated mode, in which it can route pressurised fluid to operate the related downhole tool (not shown in detail);

FIG. 6 is a longitudinal sectional view, to an enlarged scale, showing the engagement of a single large deformable ball with the ball seat of the axially shiftable sleeve shown in FIGS. 1 to 5;

FIG. 7 is a view, similar to FIG. 6, but showing an alternative arrangement in which the seat incorporates internally a series of small through-flow ports, to be blocked each following launching of a cluster of small non-deformable activator balls down the drill string;

FIG. 8 is a longitudinal view of an alternative example of a deformable activator which may be launched down the drill string to engage a seat provided in the axially shiftable sleeve;

FIG. 9 is a view, similar to FIG. 8, showing the internal ports of the activator of FIG. 8 blocked following launching of the cluster of small non-deformable activator balls down the drill string;

FIG. 9a is a view, similar to FIG. 9, showing an alternative arrangement of deformable activator, which is capable of being activated by launch of a large activator ball, and which can subsequently be deactivated by launch of two further large balls which block access to by-pass ports, thereby to cause increase in pressure upstream of the deformable activator, causing the latter to deform and pass downwardly through the valve seat and deactivate the mechanism;

FIG. 9b is a view, similar to FIG. 9a, showing a similar arrangement;

FIG. 10 is a detailed longitudinal sectional view of a further example of a by-pass tool mechanism for use in carrying out a method according to the invention;

FIG. 11 is a horizontal cross sectional view of the part of the tool shown in FIG. 10, and showing in more detail by-pass ports provided in a ball-receiving seat of a control sleeve of the tool, to permit limited continued flow of fluid to a drilling bit downstream of the tool when the tool has been activated to a by-pass mode;

FIG. 12 is a view, similar to FIG. 10, showing three different types of ball for use in activating and deactivating the tool, namely a first large deformable activation ball, a second smaller hard steel deactivation ball, and a third type of non-deformable (pressure-up) small ball forming a cluster, all for use in a manner to be described in more detail below; and FIG. 13 is a view, similar to FIG. 11, showing the third type of balls closing-off access to the by-pass seat ports shown in FIG. 11, during controlled adjustment of the tool back to its deactivated mode when normal through-flow supply of fluid to the drilling tool is resumed.

Referring now to FIGS. 1 to 5 of the drawings, a first example of an activating mechanism for carrying out a method according to the invention is designated generally by reference 10 and comprises a hollow main body 11 (forming a "top sub") which is adapted for mounting in a drill string in order to activate a related hydraulically operated device (shown in more detail in FIGS. 4 and 5). The device shown in FIGS. 4 and 5 is an under reamer, but it should be understood that this is merely one example of a related hydraulically operated device which can be activated by the ball-activated tool of the invention.

Figure 1:
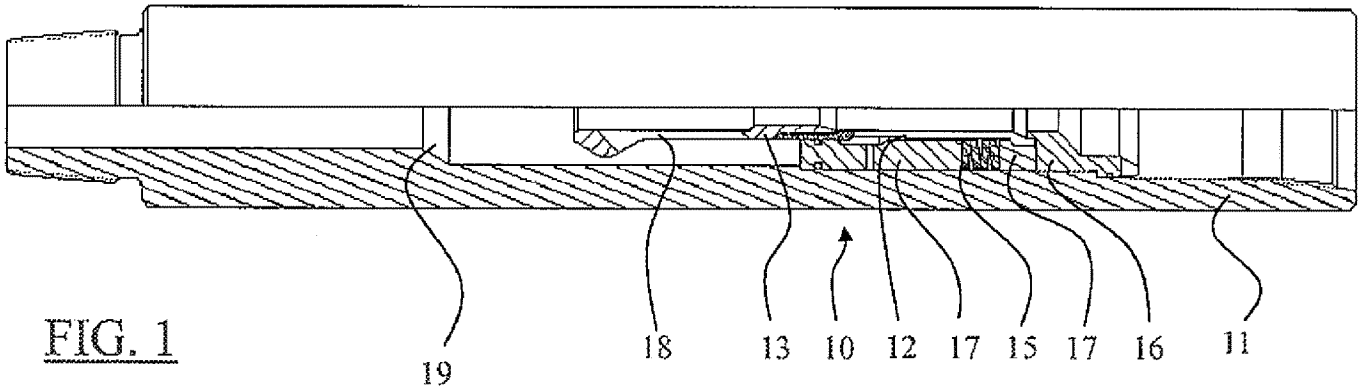
FIG. 1 is a detailed longitudinal sectional view of a ball-activated tool for use in a drill string, in order to activate a related hydraulically operated device, such as an under-reamer, and showing the tool in a de-activated mode in which fluid flow through the main body of the device is permitted.

The hollow main body 11 permits through flow of fluid to take place when the tool is in a de-activated mode, as shown in FIG. 1. A tubular collet 12 is slidably mounted in the main body 11 for movement between a retained inactive position (as shown in FIG. 1), and a released position (as shown in FIG. 2) corresponding respectively to the de-activated mode of the tool and the activated mode.

A ball-receiving seat 13 is coupled with the collet 12 and is arranged to receive an activating ball launched from the surface and down the drill string to activate the tool. A ball 14 is shown in FIG. 2 in engagement with the seat 13, and with the tool components adjusted to a released active position, which causes activation of the tool.

Spring means 15 in the form of a set of spring washers is arranged in the main body 11 and which act to maintain the collet 12 in the retained position shown in FIG. 1. The spring means 15 cooperate with a retainer, in the form of a rigid retainer ring 16, and two end spacers 17, in order to retain the tubular collet 12 in the inactive position. However, upon activation of the tool, as will be described in more detail below, the collet 12 is released by the retainer ring 16, and against the opposition of the spring means 15, in order that the collet 12 can move to a released position which initiates adjustment of the tool to the activated mode.

Figure 2:
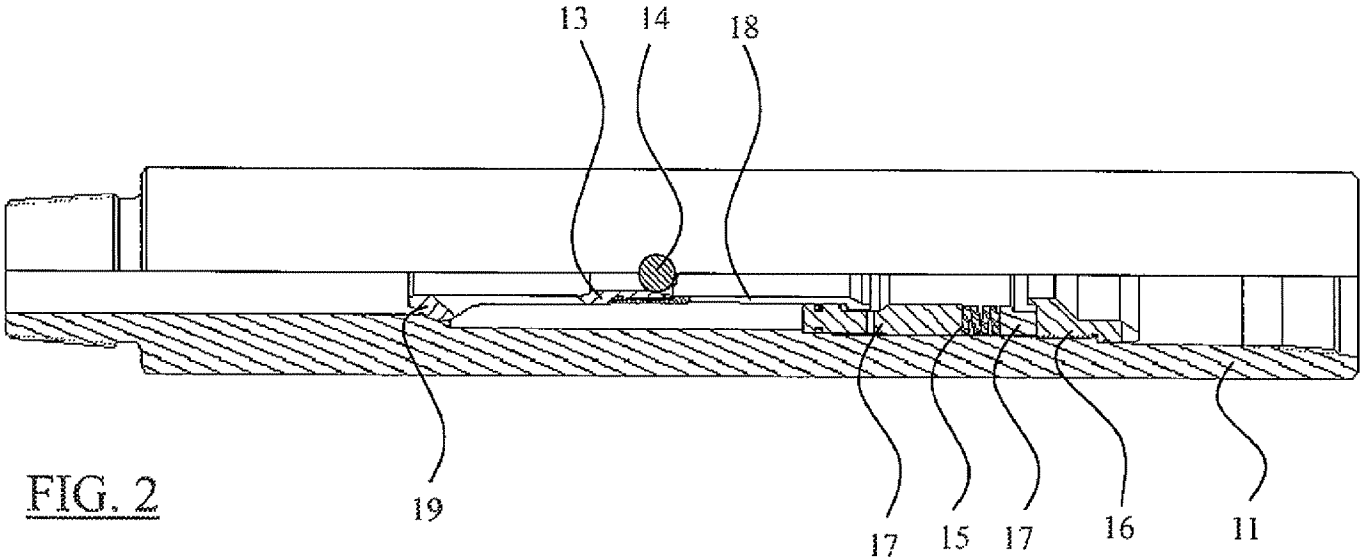
FIG. 2 is a similar view, but showing the adjustment of the components of the tool following launching of an activating ball from the surface down the drill string to activate the tool.

An activating sleeve 18 is coupled with the collet 12 for movement therewith to an activating position of engagement with a stop provided on the main body, as shown in FIG. 2. In the embodiment of FIG. 2, the stop is provided by an internal shoulder 19 which limits the movement of the sleeve 18 and collet 12 to the active position shown in FIG. 2.

Although not shown in detail in FIGS. 1 and 2, a first by-pass port is provided in the collet 12, and which communicates internally with the interior of the collet and externally with the space defined between the outer surface of the collet 12 and the inner surface of the main body 11 when the tool is activated. This will be described in more detail below with reference to FIG. 3.

There is also a second by-pass port provided in the activating sleeve 18 (also not shown in FIGS. 1 and 2), and which communicates externally with the space defined between the outer surface of the sleeve 18 and the inner surface of the main body 11, and internally with the interior of the sleeve, when the sleeve reaches its activating position shown in FIG. 2.

Referring now to FIG. 3, the four views a, b, c and d show successive stages of adjustment of the tool between the deactivated mode and the fully activated mode of the tool.

Figure 3D:
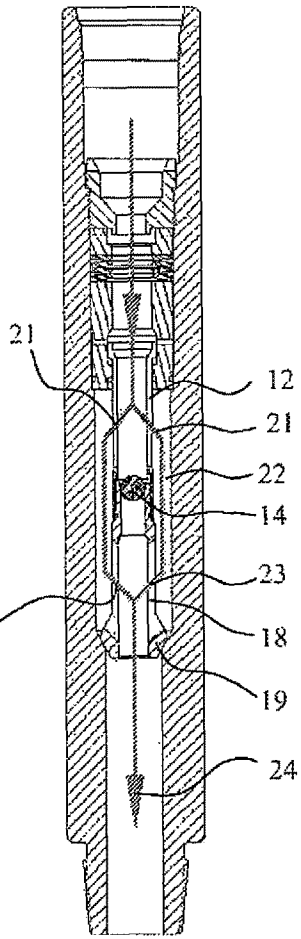
Figure 3C:
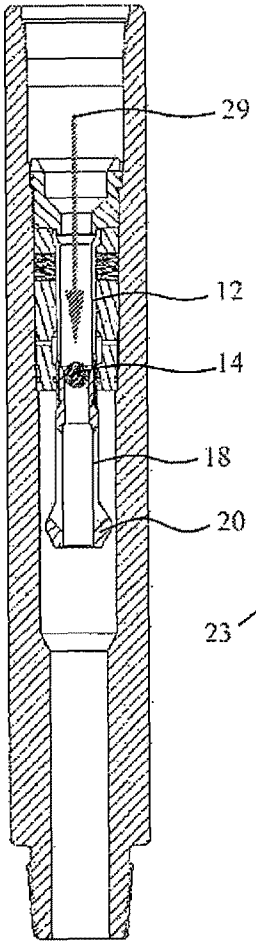
Figure 3B:
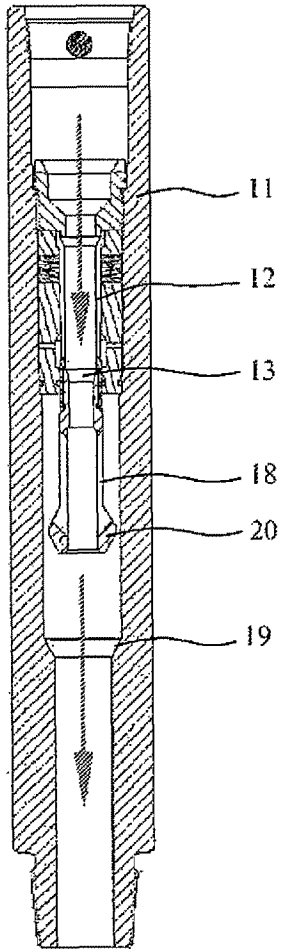
Figure 3A:
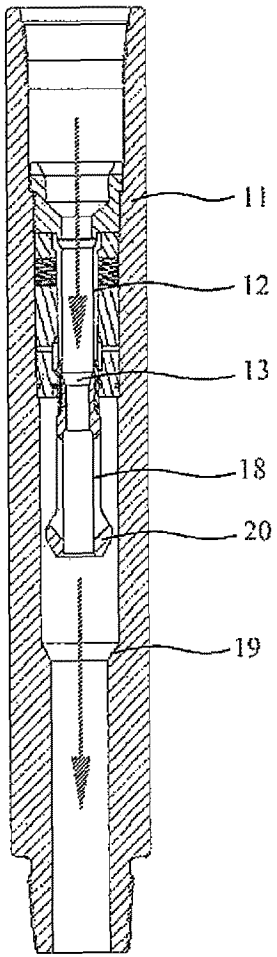

In FIG. 3a, normal fluid flow down the drill string and through the interior of the main body 11 is permitted, and during this time the related hydraulically operated device (the under reamer) remains inoperative.

FIG. 3b shows initiation of adjustment of the tool to its activated mode, which is caused by launching activating ball 14 from the surface and down the drill string, to engage seat 13.

FIG. 3c shows the components of the tool still in the deactivated positions, but with the ball 14 engaged with the seat 13, pressure builds-up upstream of the ball and pressures up the system until such time as the fluid pressure force acting on the ball 14 causes the collet 12 to be released by the retainer ring 16, so that the assembly of components 12, 13 and 18 move as a unit to the position shown in FIG. 3d, such position being defined by inter-engagement between the outer end 20 of activating sleeve 18 with shoulder 19.

As shown in FIG. 3c, the potential flow of fluid through the system, shown by arrow 29, is initially prevented by virtue of the seating of ball 14 on the seat 13, until such time as the pressure build-up is sufficient to cause the collet 12 to be released by the retaining ring 16. FIG. 3d then shows the fluid flow path through the system, which is at a higher pressure than the through flow in the deactivated mode of FIG. 3a, and such pressure is sufficient to trigger operation of the under reamer.

As can be seen in FIG. 3d, the fluid flow effectively by-passes the ball 14 engaged with seat 13, by first passing outwardly from the interior of collet 12 through one or more first by-pass ports 21 to the space 22 between the outer surface of collet 12 and the inner surface of main body 11. The by-pass flow then returns to the interior of the main body 11 via one or more second by-pass ports 23 in the activating sleeve 18. This resumed through-flow of fluid, at enhanced pressure, and shown by arrow 24, then passes to a hydraulically operated downhole tool (preferably an under-reamer), arranged below the tool 10, to initiate operation of the latter.

FIG. 4 illustrates schematically a top sub 25 in which the tool 10 is mounted, and a bottom sub 26 in which a hydraulically operated tool 27, such as an under reamer can be mounted. FIG. 4 shows the tool in its de-activated position, and FIG. 5 is a similar view to FIG. 4, but showing the tool 10 in its activated position in which it can route pressurised fluid to operate the tool 27 e.g. an under reamer.

FIG. 6 is a longitudinal sectional view, to an enlarged scale, showing the engagement of a large non-deformable activation ball 14 with an internal ball receiving seat 13 of the axially shiftable sleeve 12 which is described above and shown in more detail in FIGS. 1 to 5.

FIG. 7 shows an alternative arrangement of ball-receiving seat 13a, which is provided with an internal flow control device comprising a set of small through-flow ports, each of which is capable of having access to it blocked following launch of a cluster of small non-deformable activator balls 14a down the drill string.

FIGS. 8 and 9 show another example of an activator system for activating, and deactivating, a mechanism which controls the operation of the downhole tool. By way of example only, it will be assumed that the activator system shown in FIGS. 8 and 9 is being used in relation to activation of the mechanism and downhole tool described above with reference to FIGS. 1 to 5.

FIGS. 8 and 9 are longitudinal sectional views of a deformable activator in the form of ball-dart combination, which takes the place of the large non-deformable ball 14 described above. There is therefore shown in FIGS. 8 and 9 a deformable activator which is designated generally by reference 50 having a ball-like portion 51 which engages the seat 13, and a dart-like portion 52 projecting downwardly therefrom. The ball-like portion 51 engages the seat 13, and the dart-like projection 52 projects downwardly therefrom and through the seat. The activator 50 is hollow, defining a limited or restricted through-flow passage, so that when the activator engages the seat, it causes pressure upstream of the seat to increase so that the activator moves the sleeve 12 downwardly to a position corresponding to the by-pass mode of the mechanism.

However, the activator 50 and the seat 13 are arranged to cooperate with each other, when the activator 50 engages the seat, in such a way that restrictive flow of fluid through the sleeve 12 is maintained when the mechanism is in its by-pass mode.

Therefore, in the by-pass mode of the mechanism, continued though restricted flow of fluid can be maintained to the drilling tool to lubricate and prevent it from overheating.

The activator 50 incorporates a flow control device 53 arranged internally thereof, and comprising a ring formed with a number of ports forming separate restricted passageways.

FIG. 8 shows the activator 50 before employment of any activating and de-activating devices. When engaged with the seat 13, limited through-flow of fluid is allowed, even though the mechanism is in the by-pass mode. However, to commence the deactivation of the mechanism, at least one hard non-deformable activator is used, preferably a small hard steel ball, and which is launched down the drill string and moves to a blocking position which blocks by-pass flow to the by-pass port. This causes increase in pressure upstream of the seat 13, but generally not to a level sufficient to move the deformable activator 50 downwardly through the seat 13 and through the sleeve 12.

To complete the deactivation of the mechanism, a set of small non-deformable (pressure-up) actuators is provided, e.g. in the form of small hard balls 54 launched down the drill string. The arrangement of the seat 13 and the deformable actuator 50 is such that the balls 54 block the limited through-flow passages. The pressure upstream of the seat 13 therefore increases further, and eventually causes downward movement (accompanied by sufficient inward deformation of actuator 50) through the seat 13 and the sleeve 12.

The sleeve 12 is then returned to its position corresponding to the through-flow mode, and the mechanism then reverts to its original mode of operation. In addition to the provision of restricted passages in the flow control device 53, outlet ports 55 are provided in a nose portion of the dart-like portion 52.

The activator 50 therefore incorporates a ball-port ring within the dart-like portion, which allows a split flow situation for the drilling fluid used, in that a main part of the fluid passes via the by-pass port upon activation, whereas limited flow can be maintained via the flow control device in the activator. When it is necessary to close the tool, deactivation ball or balls are dropped down the drill string, followed by a cluster of non-deformable pressure-up balls. Two larger deactivation balls will plug up the main bypass port, whereas the smaller non-deformable (pressure-up) balls will come down into the ports in the dart-like portion, allowing the pressure above the dart to build up. Pressure will increase above the small balls until such time as the plastics material from which at least the ball-like portion of the activator 50 is formed can deform and allow the entire activator to blow downwardly through the seat and the sleeve, and be caught within a suitable "ball catcher" device (now shown) arranged downstream thereof. The balls fall through on top of the dart, and this operation can be repeated when required.

The dart may also be adapted to utilise a flap of valve or retention mechanism, to retain the small balls within the dart.

Referring now to FIGS. 9a and 9b, this shows further embodiments of deformable activators 50a and 50b respectively, and which are generally similar to the deformable activator 50 described above with reference to FIGS. 8 and 9. Corresponding parts are given the same reference numerals.

The deformable activators 50a and 50b can be launched down a drill string to engage the valve seat, and launch of a large activator ball 115 can block downward flow of fluid through the activator, and thereby pressure upstream of the activator increases thereby shifting the mechanism axially to an alternative mode of operation, whereby through flow of fluid is blocked. Alternatively, small bleed passages may be provided, to allow limited through flow of fluid to cool and lubricate the drilling bit arranged downstream thereof. However, the main portion of the drilling fluid can then pass transversely through outlet ports 112.

When it is required to revert the activating mechanism to the deactivated mode, e.g. for normal operation of the downhole tool, further deactivating ball(s) 117 is launched down the drill string, to block access to the respective outlet port(s) 112. This then causes the pressure upstream of the activator 50a, 50b to increase, and the deformable portion 51 of the activator then yields under this load, thereby allowing the entire activator to pass downwardly through the valve seat, and allow the mechanism to revert to its deactivated mode.

The deformable activators 50, 50a, 50b disclosed herein effectively are a form of deformable dart, and having an external resilient ring, which may be made of the same material as the plastics material from which deformable activator balls are usually made, so that the deformable ring can shear under load, to allow the dart to pass downwardly through the valve seat.

The ring therefore forms a seal on the outer circumference of the dart, and is assembled this way so as to allow for a large area of bypass through the tool when the latter is in the activated mode. This allows a large volume to be pumped downwardly to the operating drill bit, as well as still a large volume laterally through the nozzles in the side port(s) of the tool.

Referring now to FIGS. 10 to 13, a still further example of ball activated mechanism will now be described, for use in carrying out a method according to the invention. There is show in detail only part of a ball activated by-pass tool, designated generally by reference 110, and comprises an outer tubular casing 111 provided with at least one by-pass port 112 in its side wall, and an axially shiftable control sleeve 113 provided with a ball-receiving seat 114.

The by-pass tool 110 is insertable into a drill string, and is operative in a first operating mode to allow through flow passage of fluid to lubricate and cool a drilling bit provided downstream of the by-pass tool, and in a second operating mode to allow by-pass flow of fluid into the surrounding formation. The general construction and operation of the by-pass tool 110 may be as disclosed in more detail in U.S. Pat. No. 5,499,687, and WO01/90529, the disclosure of which is incorporated herein by this reference.

The tubular casing 111 defines a through flow passage to allow drilling fluid, usually drilling mud, to flow lengthwise of the tool 110 between inlet and outlet ends of the casing, and each being communicable with the drill string. The control sleeve 113 is mounted in the casing 111 for axial movement between first and second end positions corresponding to the first and second operating modes of the tool. FIG. 10 shows the tool in its second operating mode, permitting by-pass flow of fluid, following activation of the tool by launching of a first large activating ball, as described in more detail below.

Biassing means is provided (not shown), preferably in the form of a compression spring, which biasses the control sleeve 113 towards the first end position so as to block communication with the by-pass port 112 and allow through flow passage of fluid in the first operating mode.

The ball-receiving seat 114 provided in the tool 110 can receive a first deformable activating ball 115, launched from the surface and down the drill string, when it is required to adjust the tool from its first operating mode to its second operating mode. The seat 114 is operative when it receives the activating ball 115, as shown in FIG. 10, to move the sleeve 113 from the first end position to the second end position and against the action of the biassing means.

In the second end position of the control sleeve 113, a side port 116 in the wall of the sleeve 113 communicates with the by-pass port 112, to allow by-pass flow of fluid when required. Only a single by-pass port 112 and side port 116 are shown, but evidently more than one port may be provided, and other means of communication may be used.

When it is required to deactivate the tool, a second deactivating ball 117 (see FIG. 12) is launched down the drill string, with the result that the first ball 115 can move lengthwise of the tool 110, preferably to be received by a ball catcher device (not shown), and thereby allow the sleeve to move back to its first end position under the action of the biassing means. Thus, the second deactivating ball 117 blocks communication to the side port 116, and therefore interrupts by-pass flow via the by-pass port 112, and therefore the pressure upstream of the seat 114 increases, and when a threshold pressure is exceeded, the large deformable ball 115 deforms under the pressure load so as to move downwardly through the ball seat 114.

The description thus far generally corresponds to that which is disclosed in more detail in U.S. Pat. No. 5,499,687, and WO01/09529. However, there now follows detailed description of a simple, but highly effective additional feature, forming a preferred embodiment of the invention.

Thus, to provide limited, but continued flow of fluid through the sleeve 113, when the latter has been adjusted to its second end position corresponding to the second operating mode of the tool (by-pass flow of fluid), an additional by-pass arrangement is provided. This enables drilling fluid, usually drilling mud, to continue to flow to the drilling bit, and thereby continue lubrication and cooling of the drilling bit and prevent, or at least minimise, the risk of permanent damage by overheating to the drilling bit in high temperature applications.

The additional by-pass arrangement takes the form of at least one by-pass seat port 118 provided in the ball-receiving seat 114. In the illustrated arrangement, a circumferentially spaced set of arcuate slots are formed in the seat 114, to form the means providing continued, but limited flow of by-pass fluid, when the tool is operating in its by-pass mode shown in FIG. 10.

The subsequent launching of the deactivating ball 117 will still interrupt main by-pass flow via by-pass port 112, and subsequent increase in pressure upstream of the large deformable ball 115, and which can increase to a sufficient extent to allow deformation of the ball 115 and downward movement through the seat 114, to deactivate the tool, despite the fact that some of the fluid will be flowing downwardly through the tool, in limited manner, via the by-pass seat ports 118.

However, to ensure that the pressure being bled-off via the by-pass seat port 118 does not prevent deactivation of the tool by launching of the second deactivating ball 117, it is preferred to provide a third type of ball for use with the tool 110. This third type of ball is to be used, in addition to the second deactivating ball 117, when it is required to revert the tool 110 back to its first operating mode from its second operating mode. The third type of ball is a small non-deformable ball, and preferably supplied in a cluster of balls 119, as shown in FIGS. 12 and 13.

The balls 119 are of such a size that, when used together in a cluster, they can block flow of fluid through the by-pass ports 118, and therefore enable the pressure upstream of the seat 114 to increase still further (in addition to the pressurisation caused by launching of the second deactivating ball 117), and thereby ensure the deformation of the first activation ball 115 and subsequent downward movement through the seat 118 and followed by upward movement of the control sleeve 113 under the action of its spring biassing back to the first operating position.

In the illustrated embodiment, more than one of the balls 119 is used in order to close off each of the by-pass seat ports 118. However, other arrangements are possible, including single balls 119 each closing off a respective by-pass port, although this is not shown in the illustrated embodiment.

Upon deformation of the first activating ball 115 and its movement through the seat 114, this is then followed by the second deactivating ball 117 and the third type of balls 119.

Conveniently, a ball catcher device (not shown) is arranged downstream of the seat 114, to catch at least the first (larger) ball 115, and preferably also the second deactivating ball 117, which is a hard steel ball. The third type of ball 119 is smaller in diameter than the other balls, in view of the size and shape of the by-pass ports 118, and therefore it will be acceptable for the balls 119 to be discharged through the drilling bit and into the surrounding formation being drilled, or to be returned to surface with the return flow of drilling mud.

The by-pass tool 110 as described above therefore enables the tool to be activated by dropping the first activation ball 115, to initiate main by-pass flow via the by-pass port 112 in the casing, while still allowing a limited flow of fluid to pass around the activation ball 115 and through the seat ports 118. There is therefore a split flow situation, in which the main by-pass flow is conveyed via the by-pass port 112, while a smaller proportion of the fluid passes downwardly through the valve seat 114 via the seat ports 118.

However the provision of the seat ports 118 does mean that some of the pressure above the seat is bled-off, and therefore this reduces the pressure available to deform the activation ball 115, after launch of the de-activating ball 117. It is for this reason that the third type of balls 119 are provided, which are able to blank-off at least the major part of the access to the seat ports 118.

The typical sequence of operations therefore would be as follows: drop the plastics activation ball 115, to open up the tool, and pump main by-pass fluid for as long as the operator requires, but with split flow and some of the flow going down through the sleeve to lubricate and cool the drilling bit, in addition to the main by-pass flow via the circulating ports above the ball 115.

To deactivate the tool, the steel deactivation ball 117 is dropped down the drill string, in the case of a single ported tool, or two deactivation balls are dropped in the case of a dual ported tool. Thereafter, the non-deformable pressure-up balls (the third balls 119) are dropped down the drill string. When the steel deactivation ball(s) 117 closes access to the side port 16 above the ball 115, the system starts to pressure-up, and further flow now only continues around the deformable activation ball 115, and via the seat ports 118. When the non-deformable pressure-up third balls 119 reach the seat 114, they plug-up the seat ports 118, allowing the operator, or allowing the system, to pressure-up to a greater extent and thereby ensure deformation of the main activation ball 115. Ball 115 then passes downwardly, upon deformation, through the seat 114, and this is followed by the spring biassing urging the control sleeve 113 to its first end position (sleeve closed position), and the steel deactivation ball(s) 117 can then fall downwardly through the ball seat 114, following the deformable activation ball 115, and both of these can be caught by a ball catcher device (not shown). However, the smaller, non-deformable and pressure-up balls 119 are sufficiently small that they can be displaced downwardly through the drilling tool and through the drilling bit, and out into the surrounding formation. Alternatively, balls 119 can return to surface via the return flow of drilling mud.

The invention claimed is:

1. An activating mechanism for controlling the operation of a downhole underreamer tool in a drill string and which is intended to be housed in a portion of the drill string upstream of the downhole underreamer tool, in which:

(a) the activating mechanism has a first mode in which it allows through-flow of drilling fluid to the downhole underreamer tool in an operative condition and a second mode in which through-flow of fluid is blocked in an inoperative condition;

(b) the activating mechanism has a number of through-flow ports permitting through-flow of drilling fluid in said first mode of the mechanism and which are capable of being blocked by launching a number of flow blocking activator balls down the drill string and which each are of such size and shape that they can block access to said through-flow ports in order to activate the mechanism to the second mode and thereby adjust the downhole underreamer tool from one mode of operation to another; and (c) the inoperative condition is obtained when the reamer blades are in a withdrawn position relative to the body of the tool, and in the operative condition the reamer blades are in a radially projected position relative to the axis of the drill string so as to be engageable with the surrounding formation.

[2. A mechanism taking the form of a ball-activated tool for use in a drill string in order to activate a related hydraulically operated device and which comprises:

a hollow main body adapted for mounting in a drill string and through which fluid can flow when the tool is a in a de-activated mode;

a tubular collet slidably mounted in the main body for movement between a retained inactive position and a released position corresponding respectively to the deactivated mode of the tool and an activated mode;

a ball-receiving seat coupled with the collet and arranged to receive an activating ball launched from the surface and down the drill string to activate the tool;

spring means arranged in the main body to maintain the collet in the retained position;

a retainer arranged in the main body to engage with and to retain the tubular collet in the inactive position, and to release the collet when the tool is activated;

an activating sleeve coupled with the collet for movement therewith to an activating position of engagement with a stop on the main body;

a first by-pass port provided in die collet and communicable internally with the interior of the collet and externally with the space defined between the outer surface of the collet and the inner surface of the main body when the tool is activated; and a second by-pass port provided in the activating sleeve and communicable externally with the space defined between the outer surface of the sleeve and the inner surface of the main body, and internally with the interior of the sleeve, when the sleeve reaches its activating position;

whereby, upon engagement of the activating ball with the seat to activate the tool, the following sequence takes place:

a. fluid pressure builds-up upstream of the seat;

b. subsequent release of the collet by the retainer;

c. movement of the collet, the ball and the seat, and the activating sleeve until the sleeve reaches its activating position of engagement with stop; and d. by-pass flow of fluid around the ball and valve seat via the first and second by-pass ports so that pressurised fluid can flow via the main body to activate the related hydraulically operated device.]

[3. A mechanism according to claim 2, in which the activating sleeve is engageable with a shoulder provided internally of the main body to form said stop.]

[4. A mechanism according to claim 2, in which the collet is coupled with the activating sleeve for movement therewith via said valve seat.]

[5. A mechanism according to claim 2, in which the main body includes a top sub in which the tool is incorporated, and a bottom sub in which a tool, is mounted.]

[6. A mechanism according to claim 2, in which the ball-activated tool is capable of being activated by launching a single large non-deformable ball down the drill string to engage the seat dedicated to the large ball.]

[7. A mechanism according to claim 2, in which the ball activated tool is capable of being activated by launching a cluster of small hard non deformable balls down the drill string to engage a seat which is provided with a number of ports each dedicated to be engaged by a respective one of the small balls.]

8. A ball-activated by-pass tool for use in a drilling operation, and which is insertable into a drill string and which is operative in a first operating mode to allow through-flow passage of fluid to lubricate and cool a drilling bit arranged downstream of the by-pass tool, and in a second operating mode to allow by-pass flow of fluid, and said tool comprising:

a tubular casing defining a through-flow passage to allow fluid to flow lengthwise of the tool between inlet and outlet ends of the casing and each being communicable with the drill string;

a transverse by-pass port in the wall of the casing;

a control sleeve mounted in the casing for axial movement between first and second end positions corresponding to the first and second operating modes of the tool;

means biasing the control sleeve towards the first end position so as to block communication with the by-pass port and allow through-flow passage of fluid in the first operating mode;

a ball-receiving seat provided in the tool to receive a first deformable activating ball to be launched down the drill-string when it is required to adjust the tool from its first operating mode to its second operating mode, said seat being operative when it receives the activating ball to move the sleeve from its first end position to its second end position against the action of the biasing means, and in which the first activating ball is deformable by the action of a second de-activating ball launched down the drill string so that the first ball can move lengthwise of the tool and thereby allow the sleeve to move back to its first end position under the action of the biasing means when it is required to adjust the tool from its second operating mode to its first operating mode; and at least one by-pass seat port provided in the ball-receiving seal and which is operative to permit limited flow of fluid through the sleeve when the latter is in its second end position,

*wherein the control sleeve has a side port which is communicable with the by-pass port in the wall of the casing, when the tool is in its second operating mode.*

[9. A tool according to claim 8, in which the control sleeve has a side port which is communicable with the by-pass port in the wall of the casing, when the tool is in its second operating mode.]

10. A tool according to claim 8, including a third type of ball for use, in addition to the second de-activating ball when it is required to revert the tool back to its first operating mode from its second operating mode.

11. A tool according to claim 10, in which a set of circumferentially spaced slots are formed in the ball seat, to form said seat port, and a cluster of said third type of balls is provided to be launched from the surface, to close-off at least a major part of access to said slots.

12. A tool according to claim 8, in which a ball catcher device is arranged downstream of the ball receiving seat, to catch at least said first activation ball and optionally said second de-activating ball.

[13. An activating mechanism for controlling the operation of a downhole tool and which comprises:

a hollow main body adapted for mounting in a drill-string and through which fluid to the tool can be routed;

an actuating sleeve defining a through-flow passage and slidably mounted in the main body for movement between positions corresponding to a through-flow mode and a by-pass mode of the mechanism;

biasing means acting on the sleeve to urge it to its position corresponding to the through-flow mode of the mechanism;

a seat providing access to said passage in the through-flow mode of the mechanism; and a deformable activator capable of being launched down the drill-string to engage the seat and thereby cause pressure upstream of the seat to increase so that the deformable activator moves the sleeve to its position corresponding to the by-pass mode of the mechanism;

in which the deformable activator and the seat are arranged to co-operate with each other, when the deformable activator engages the seat, in such a way that restricted flow of fluid through the sleeve is maintained when the mechanism is in its by-pass mode;

the deformable activator being a deformable dart comprising:

a dart body having a outer side surface portion with a circumferential groove in the side surface portion;

an external deformable ring which is inwardly deformable, the external deformable ring being mounted in the circumferential groove and protruding outwardly therefrom such that the deformable ring is capable of seating on said seat with at least a portion of the dart body below the circumferential groove projecting downwardly through the seat, wherein the external deformable ring is capable of deforming under load, thereby allowing the entire deformable activator to pass downwardly through the seat;

wherein the deformable ring has an outer surface, at least a portion of which tapers downward and radially inwardly.]

[14. A mechanism according to claim 13, in which the hollow body has at least one by-pass port to direct fluid flow laterally of the sleeve and the body when the mechanism is in its by-pass mode, and with the sleeve being moved by the deformable actuator so as to allow access to the by-pass port.]

[15. A mechanism according to claim 13, in which a non-deformable activator is provided, which is capable of being launched down the drill string and to move to a blocking position which blocks by-pass flow of fluid, and thereby causes increase in pressure upstream of the seat.]

16. A mechanism according to [claims 13] *claim 19*, including a set of small non-deformable pressure-up activators, capable of being launched down the drill string, and the arrangement of the seat and the deformable activator is such that [the] *each* pressure-up [activators are then] *activator is* capable of blocking [the limited through-flow passages] *one of the ports*.

[17. A mechanism according to claims 13, in which the deformable activator comprises a ball-dart combination, in which a ball-like portion at least is deformable and is capable of seating on said seat, and a dart-like portion is capable of projecting downwardly through the seat.]

[18. A mechanism according to claim 17, in which the deformable activator is hollow and is provided with an internal flow control device.]

19. A mechanism according to claim [18] *39*, in which the flow control device comprises a carrier ring provided with a number of separate ports.

20. A mechanism according to claim [13] *36*, in which:

the deformable activator is capable of being launched down the drill string to engage the seat, so that pressure upstream of the seat increases and the *deformable* activator moves the sleeve so that the mechanism takes up its by-pass mode, while allowing limited flow of fluid to the tool to be maintained in one of its modes of operation, and said mechanism also including:

a small hard ball(s) capable of being launched down the drill string when it is required to provide by-pass flow of fluid; and one or more de-activator ball(s) capable of being launched down the drill string to block limited flow of fluid through the sleeve, when it is required to revert the tool to another of its modes, such that the pressure upstream of the seat increases and causes downward displacement, accompanied by inward deformation, of the deformable activator through the seat so that the mechanism reverts to its through-flow mode.

21. An activating mechanism for controlling the operation of a downhole tool and which comprises:

a hollow main body adapted for mounting in a drill string and through which fluid to the tool can be routed;

an actuating sleeve defining a through-flow passage and slidably mounted in the main body for movement between positions corresponding to a through-flow mode and a by-pass mode with a mechanism;

biasing means acting on the sleeve to urge it to its position corresponding to the through-flow mode of the mechanism;

a seat providing access to said passage in the through-flow mode of the mechanism;

a deformable activator capable of being launched down the drill string to engage the seat and thereby cause pressure upstream of the seat to increase;

an activator ball capable of being launched down the drill string to engage a through-flow seat at an upstream end of the *deformable* activator, thereby to increase, or still further increase the pressure upstream of the *deformable* activator and thereby cause the sleeve to move to its position corresponding to the by-pass mode of the mechanism; and at least one deactivating ball capable of being launched down the drill string to block access to an outlet port thereby to increase the pressure upstream of the deformable activator until such time as the deformable activator deforms itself to pass *the entire deformable activator* downwardly through the seat to allow the mechanism to revert to its through-flow mode,

*the deformable activator being a deformable dart comprising:*

*a dart body having an outer side surface portion with a circumferential groove in the side surface portion;*

*an external deformable ring which is inwardly deformable, the external deformable ring being mounted in the circumferential groove and protruding outwardly therefrom such that the deformable ring is capable of seating on said seat with at least a portion of the dart body below the circumferential groove projecting downwardly through the seat;*

*wherein the deformable ring has an outer surface, at least a portion of which tapers downward and radially inwardly.*

*22. An activating mechanism for controlling the operation of a downhole tool and which comprises:*

*a hollow main body adapted for mounting in a drill-string and through which fluid to the tool can be routed;*

*an actuating sleeve defining a through-flow passage and slidably mounted in the main body for movement between positions corresponding to a through-flow mode and a by-pass mode of the mechanism;*

*biasing means acting on the sleeve to urge it to its position corresponding to the through-flow mode of the mechanism;*

*a seat providing access to said passage in the through-flow mode of the mechanism; and*

*a deformable dart capable of being launched down the drill-string to engage the seat and thereby cause pressure upstream of the seat to increase so that the deformable dart moves the sleeve to its position corresponding to the by-pass mode of the mechanism;*

*in which the deformable dart and the seat are arranged to co-operate with each other, when the deformable dart engages the seat, in such a way that restricted flow of fluid through the sleeve is maintained when the mechanism is in its by-pass mode; and*

*in which the deformable dart comprises a dart body having a top end, a cylindrical outer side surface, a bottom end and a circumferential groove having an upper annular surface and a lower annular surface;*

*a deformable ring capable of inward deformation mounted in the circumferential groove and protruding outwardly therefrom such that the deformable ring is capable of seating on said seat, with a portion of the dart body being capable of projecting downwardly through the seat, and*

*when the deformable dart is seated on the seat and there is sufficient pressure upstream of the deformable dart, the deformable ring is capable of deforming to allow the entire deformable dart to pass downwardly through the seat,*

*wherein the deformable ring has an outer surface, at least a portion of which tapers downward and radially inwardly.*

*23. A mechanism according to claim 22 in which the dart body is solid.*

*24. A mechanism according to claim 23 wherein the bottom end of the dart body has an outer surface that tapers downward and radially inwardly.*

*25. A mechanism according to claim 24 wherein the bottom end of the dart body has a rounded outer surface.*

*26. A mechanism according to claim 22 in which the cylindrical outer side surface is defined by a tubular side wall, and the dart body comprises a flow through passageway extending from an inlet opening at the top end of the dart body to an outlet opening at the bottom end of the dart body.*

*27. A mechanism according to claim 26 in which the diameter of the flow through passageway is greater than half of the diameter of the dart body.*

*28. A mechanism according to claim 26 in which the flow through passageway comprises an upper portion having a first diameter and a lower portion having a second diameter about the same as the first diameter.*

*29. A mechanism according to claim 26 in which the flow through passageway has an upper portion and a lower portion in which the lower portion divides into multiple separate outlet passageways, each having a diameter less than the diameter of the upper passageway.*

*30. A mechanism according to claim 22, wherein the dart body comprises at least two components including an upper component and a lower component which are assembled together into a unitary construction.*

*31. A mechanism according to claim 30, wherein the lower component comprises a tubular, generally cylindrical outer side wall and the upper component comprises a tubular, generally cylindrical inner side wall sized to fit closely within the tubular, cylindrical outer side wall of the lower component and when assembled, at least a portion of the inner sidewall of the upper component is located within the outer sidewall of the lower component.*

*32. A mechanism according to claim 31, wherein the upper component comprises a flange that extends radially outwardly from the upper end of the inner side wall of the upper component and which flange forms the upper annular surface of the circumferential groove and wherein the upper edge of the outer side wall of the tubular lower component forms the lower annular surface of the circumferential groove.*

*33. A mechanism according to claim 30 in which the upper component comprises the upper annular surface and the lower component comprises the lower annular surface.*

*34. A mechanism according to claim 30 in which the upper component and the lower component define an axial position of the deformable ring with respect to the dart body.*

*35. An activating mechanism for controlling the operation of a downhole tool and which comprises:*

*a hollow main body adapted for mounting in a drill-string and through which fluid to the tool can be routed;*

*an actuating sleeve defining a through-flow passage and slidably mounted in the main body for movement between positions corresponding to a through-flow mode and a by-pass mode of the mechanism;*

*biasing means acting on the sleeve to urge it to its position corresponding to the through-flow mode of the mechanism;*

*a seat providing access to said passage in the through-flow mode of the mechanism; and*

*a deformable activator capable of being launched down the drill-string to engage the seat and thereby cause pressure upstream of the seat to increase so that the deformable activator moves the sleeve to its position corresponding to the by-pass mode of the mechanism;*

*in which the deformable activator and the seat are arranged to co-operate with each other, when the deformable activator engages the seat, in such a way that restricted flow of fluid through the sleeve is maintained when the mechanism is in its by-pass mode;*

*the deformable activator being a deformable dart comprising:*

*a dart body having an outer side surface portion with a circumferential groove in the side surface portion;*

*an external deformable ring which is inwardly deformable, the external deformable ring being mounted in the circumferential groove and protruding outwardly therefrom such that the deformable ring is capable of seating on said seat with at least a portion of the dart body below the circumferential groove projecting downwardly through the seat;*

*wherein the dart body comprises at least two components including an upper component and a lower component which are assembled together into a unitary construction, further comprising at least one of the following features:*

*(i) the circumferential groove has an upper annular surface and a lower annular surface wherein the upper component comprises the upper annular surface and the lower component comprises the lower annular surface;*

*(ii) the upper component and the lower component define an axial position of the deformable ring with respect to the dart body.*

*36. An activating mechanism for controlling the operation of a downhole tool and which comprises:*

*a hollow main body adapted for mounting in a drill-string and through which fluid to the tool can be routed;*

*an actuating sleeve defining a through-flow passage and slidably mounted in the main body for movement between positions corresponding to a through-flow mode and a by-pass mode of the mechanism;*

*biasing means acting on the sleeve to urge it to its position corresponding to the through-flow mode of the mechanism;*

*a seat providing access to said passage in the through-flow mode of the mechanism; and*

*a deformable activator capable of being launched down the drill-string to engage the seat and thereby cause pressure upstream of the seat to increase so that the deformable activator moves the sleeve to its position corresponding to the bypass mode of the mechanism:*

*in which the deformable activator and the seat are arranged to co-operate with each other, when the deformable activator engages the seat, in such a way that restricted flow of fluid through the sleeve is maintained when the mechanism is in its bypass mode;*

*the deformable activator being a deformable dart comprising:*

*a dart body having a outer side surface portion with a circumferential groove in the side surface portion;*

*an external deformable ring which is inwardly deformable, the external deformable ring being mounted in the circumferential groove and protruding outwardly therefrom such that the deformable ring is capable of seating on said seat with at least a portion of the dart body below the circumferential groove projecting downwardly through seat,*

*wherein the external deformable ring is capable of deforming under load, thereby allowing the entire deformable activator to pass downwardly through the seat;*

*wherein the deformable ring has an outer surface, at least a portion of which tapers downward and radially inwardly.*

*37. A mechanism according to claim 36, in which the hollow body has at least one by-pass port to direct fluid flow laterally of the sleeve and the body when the mechanism is in its by-pass mode, and with the sleeve being moved by the deformable actuator so as to allow access to the by-pass port.*

*38. A mechanism according to claim 36, in which a non-deformable activator is provided, which is capable of being launched down the drill string and to move to a blocking position which blocks by-pass flow of fluid, and thereby causes increase in pressure upstream of the seat.*

*39. A mechanism according to claim 36, in which the deformable activator is hollow and is provided with an internal flow control device.*

*40. A mechanism according to claim 36, in which the dart body comprises at least two components including an upper component and a lower component which are assembled together into a unitary construction.*

*41. A mechanism according to claim 40 in which the circumferential groove has an upper annular surface and a lower annular surface and in which the upper component comprises the upper annular surface and the lower component comprises the lower annular surface.*

*42. A mechanism according to claim 40 in which the upper component and the lower component define an axial position of the deformable ring with respect to the dart body.*

* * * * *